INVENTOR
WILLIAM W. HANSEN
BY Herbert H. Thompson
HIS ATTORNEY

June 25, 1946.   W. W. HANSEN   2,402,622
RADIATING ELECTROMAGNETIC WAVE GUIDE
Filed Nov. 26, 1940   4 Sheets-Sheet 2
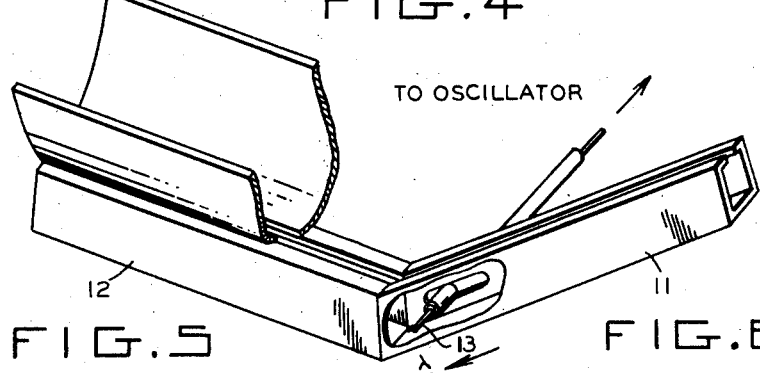
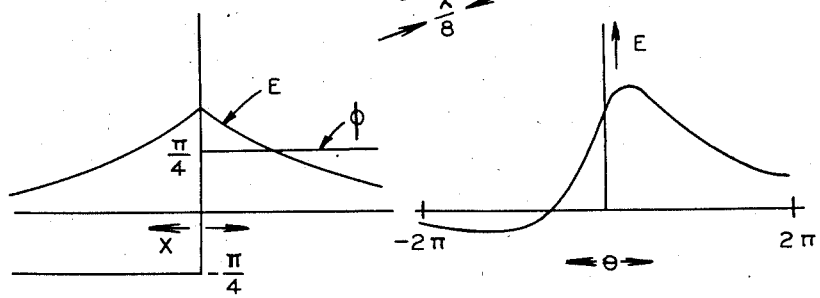
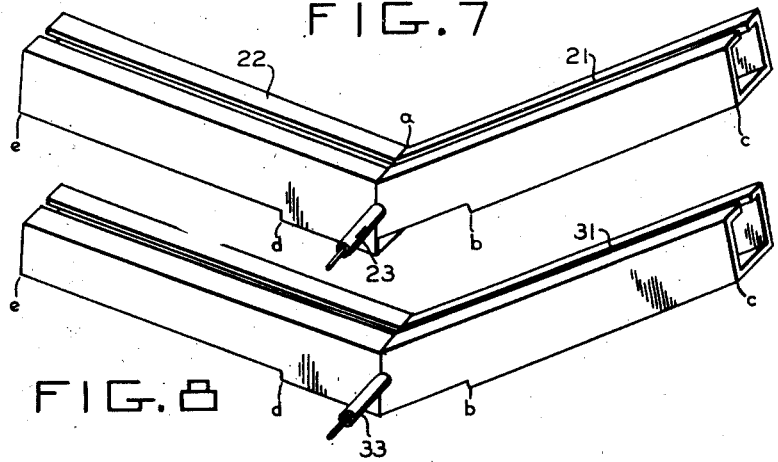
INVENTOR.
WILLIAM W. HANSEN
BY Herbert H. Thompson
HIS ATTORNEY June 25, 1946. W. W. HANSEN 2,402,622
RADIATING ELECTROMAGNETIC WAVE GUIDE
Filed Nov. 26, 1940 4 Sheets-Sheet 3
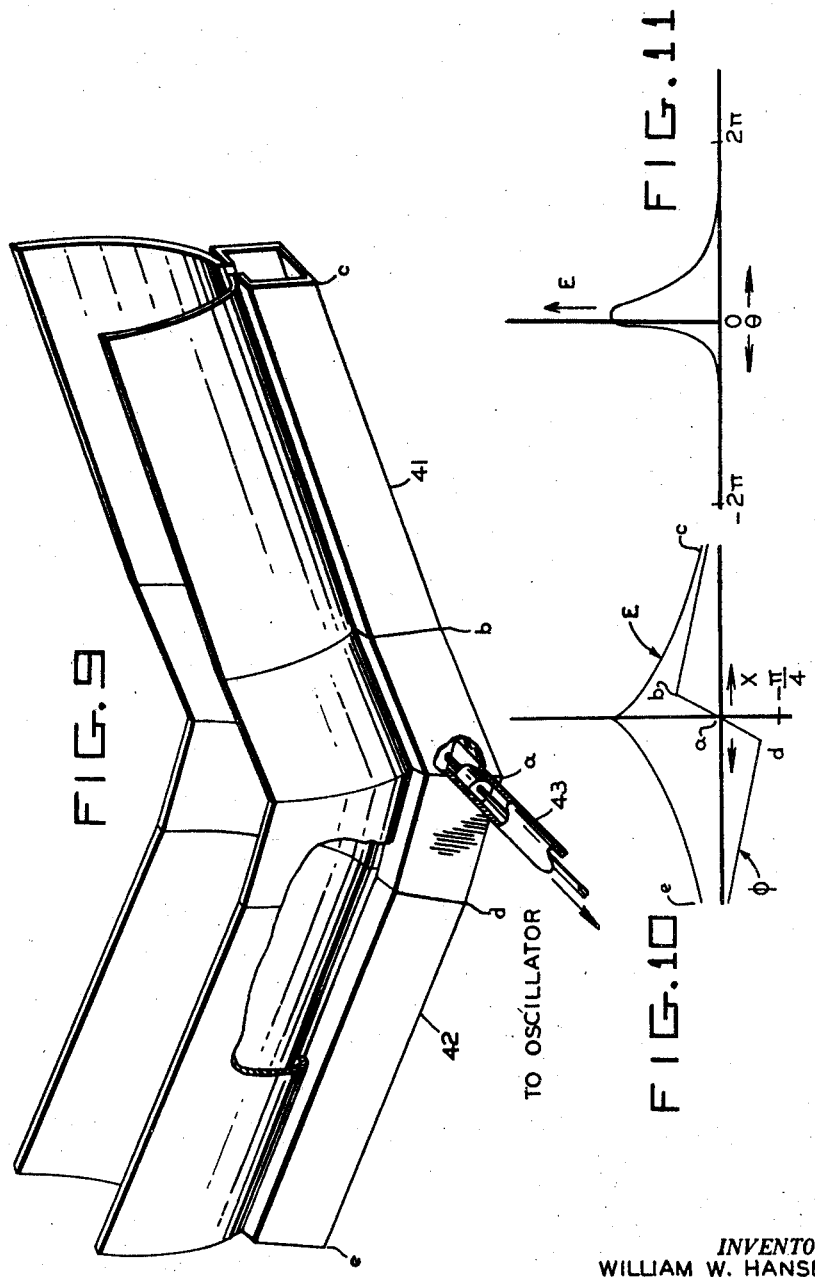
INVENTOR.
WILLIAM W. HANSEN
BY
Herbert H. Thompson
HIS ATTORNEY

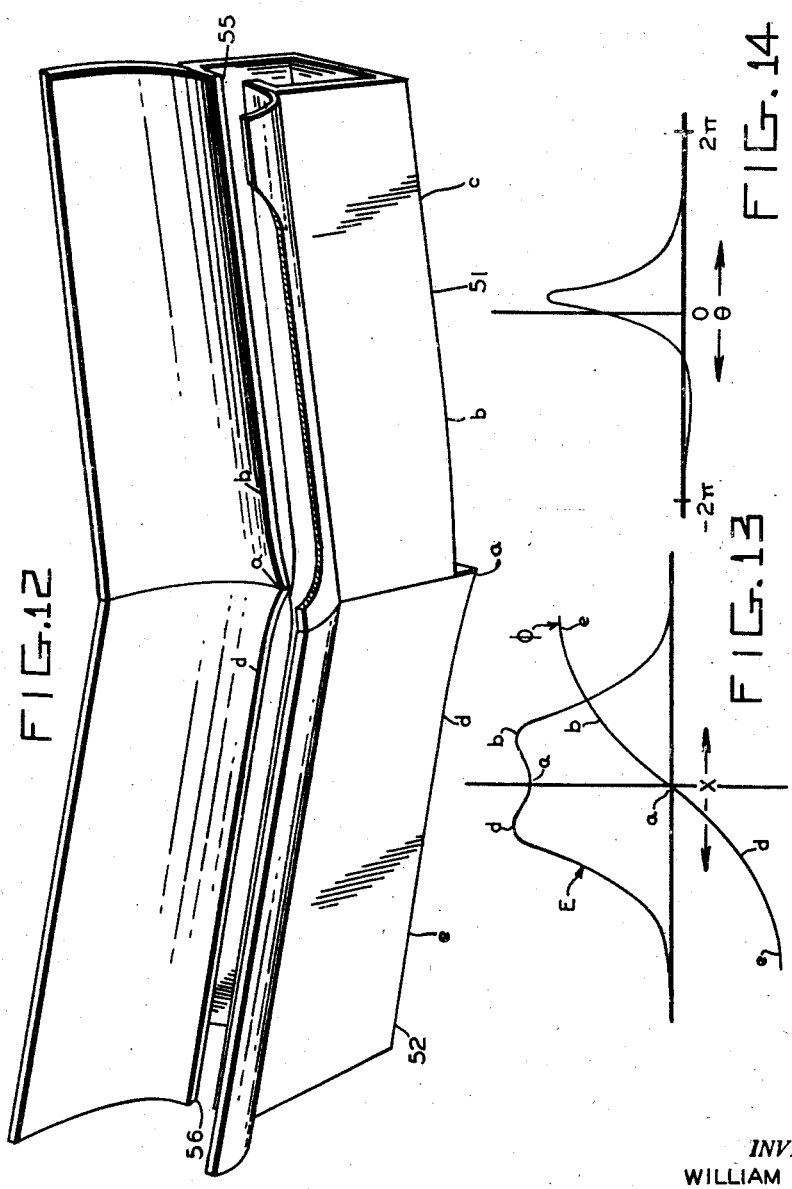

Patented June 25, 1946

2,402,622

UNITED STATES PATENT OFFICE 2,402,622

RADIATING ELECTROMAGNETIC WAVE GUIDE

William W. Hansen, Stanford University, Calif., assignor to The Board of Trustees of the Leland Stanford Junior University, Stanford University, Calif.

Application November 26, 1940, Serial No. 367,196

26 Claims. (Cl. 250—11)

This invention relates, generally, to the projection of radio waves in the form of a beam whose symmetry, or lack of symmetry, is controllable at will, and the invention has reference more particularly to radiating electromagnetic wave guides of the general type disclosed in my copending application, Serial Number 344,633, filed July 10, 1940, of which the present application is a continuation-in-part.

When a radiating electromagnetic wave guide is utilized to project a beam of electromagnetic radiation, to furnish, for instance, a blind landing path for airplanes, it is very important that the lower portion of such beam be well defined. To achieve such a result, and at the same time define suitable gliding angles for airplanes, requires the radiation intensity in the lower part of the beam adjacent to the ground to fall off very rapidly in the direction of increasing angles with the beam axis, in order that the amount of electromagnetic radiation striking the surface of the ground shall be very small as compared to the total energy radiated. In this manner interference patterns within the beam caused by reflection from the ground surface of electromagnetic energy reaching the ground can be minimized.

When a radio beam suitable for blind landing has been so designed that for the desirable range of gliding angles no appreciable interference is obtained due to ground reflections, then it may be found that for a beam possessing symmetry in a vertical plane, the radiation intensity for increasing angles from the axis of the beam in a skyward direction falls too rapidly, so that airplanes may experience difficulty in locating the beam, and it will be seen that symmetrical beams are not generally satisfactory for this use. Also, it has been found that unsymmetrical beams are highly desirable for other purposes, as for certain types of directional communications, navigation, etc.

It is an object of the present invention to provide radiating electromagnetic wave guides for projecting radio beams which have an unsymmetrical radiation pattern in the plane of maximum directivity, such an unsymmetrical radiation pattern being controlled by the design of the wave guide.

Another object of the present invention is to increase the radiation intensity of an electromagnetic wave guide in a desired direction by increasing the directivity of the projected radio beam in the plane at right angles to the plane of maximum directivity, whereby the useful signal strength for a given energy supply will be increased, or the same signal strength may be obtained with less electromagnetic energy.

In systems embodying the present invention, such as blind landing systems, the desired plane of maximum directivity will be vertical, and the axis of the beam will be directed to provide suitable gliding angles. In the plane of maximum directivity an unsymmetrical beam will have one direction in which the radiation intensity with increasing angles from the axis of the beam falls more rapidly than for a symmetrical beam, and for blind landing systems such a direction will be towards the ground from the axis of the beam. In the opposite direction, the radiation intensity with increasing angles from the axis of the beam will fall less rapidly than for a symmetrical beam, and in a blind landing system such a direction will be skyward from the axis of the beam, so that the beam can be readily picked up and used by an airplane.

Still another object of the present invention is to provide radiation guides having either variable cross-sections along their lengths, or being formed of wave guide portions extending in varying directions, to thereby obtain the desired radiation pattern.

Other objects and advantages will become apparent from the specification, taken in connection with the accompanying drawings wherein the invention is embodied in concrete form.

In the drawings,

Fig. 4 represents a wave guide similar to that indicated in Fig. 1, but shown unsymmetrically excited.

Fig. 5 represents the field excitation at the guide of Fig. 4, together with the phase displacement resulting from the unsymmetrical excitation.

Fig. 6 represents the signal strength of the guide of Fig. 4 at a distance from the guide, illustrating the dissymmetry introduced in the radiation pattern.

Figs. 7, 8, and 9 illustrate alternate means for obtaining an unsymmetrical radiation pattern in wave guides, wherein the field excitation and phase relation of the electric field at the guide correspond to the graphs shown in Fig. 10, and the unsymmetrical radiation pattern given by the guide is indicated in Fig. 11.

Fig. 12 represents a wave guide illustrating still another means for obtaining an unsymmetrical pattern.

Figs. 13 and 14 are similar to Figs. 10 and 11, but relate to the structure of Fig. 12.

As more fully explained in the above referred application, the general type of radiation guide of this invention is formed of a multiplicity of wave guides excited in the proper phase. Electromagnetic energy is caused to emerge from a wall of the wave guides to maintain a desired field strength excitation immediately outside the radiation guide. Due to a specific field strength excitation at the guide having a specific phase relation, a radiation pattern in space is obtained resulting from the superposition in proper phase relation of the radiation emanating from the various portions of the radiation guide.

The wavelength of an electromagnetic radiation within a guide is longer than its wavelength in free space, and depends upon the frequency of the radiation and the cross-sectional dimensions of the guide. The ratio of the wavelength of the radiation within the guide to its wavelength outside determines the angle which the direction of radiation outside the guide makes with the guide. The contribution of the various elements of a wave guide to the signal strength at a given point in space may be determined graphically by adding the vectors representing the contribution of the various elements in their proper phase relations. For certain electric field excitations at the radiation guide, the radiation pattern can be conveniently obtained by utilizing the known properties of Fourier transforms, as more fully explained in the above referred-to application.

Figure 1:
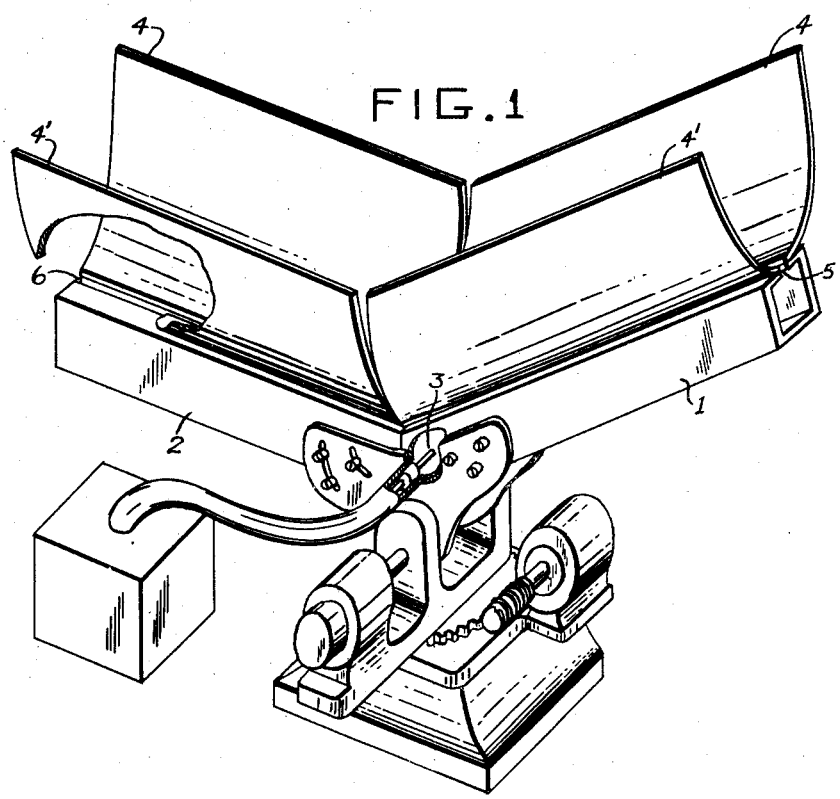
Fig. 1 is a perspective view of a radiation guide embodying means for narrowing the radiation pattern in its wide dimensions.
Figure 2:
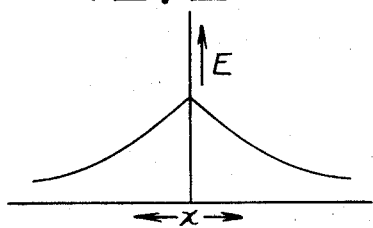
Fig. 2 is a graph giving as ordinate the field excitation at the guide as a function of the distance measured along the guide for the radiation guide of Fig. 1.
Figure 3:
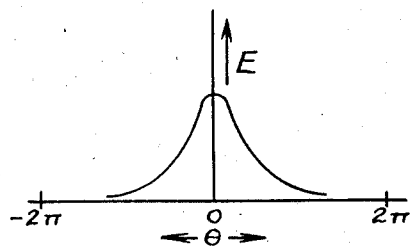
Fig. 3 is a graph giving the signal strength at a distance from the radiation guide in the plane of the guide as a function of the angular deviation from the direction of maximum propagation, when the field excitation at the guide is as given in Fig. 2.

In Fig. 1, the radiation guide illustrated is formed of two straight wave guide portions, 1 and 2, of equal cross-section, excited in the same phase and at the same intensity by antenna 3 symmetrically located with respect to the wave guides 1 and 2. Wave guides 1 and 2 form an angle having a bisectrix corresponding to the direction of maximum radiation of the radiation guide. Guides 1 and 2 are provided with slots 5 and 6 of uniform width in corresponding walls thereof so that a constant proportion of the electromagnetic energy within the guides is radiated into space for each element of length. By taking the antenna location in Fig. 1 as origin of abscissae, then the electric field immediately outside the guide is as indicated in Fig. 2, decreasing exponentially with increasing distance from the origin, where the electric field is plotted as ordinate E, against distances, $x$, along the guides, as abscissae. Such a field excitation at the guide will give a field distribution in the plane of the guide at a distant point as shown in Fig. 3, where the abscissae are proportional to the angular deviation from the direction of maximum radiation, which is the bisectrix of the angle between wave guides 1 and 2 in Fig. 1. The proportionality factor relating actual angles to the abscissae plotted in Fig. 3 can be determined from the physical constants involved, or may readily be determined for an actual radiation guide by a field test to determine, for instance, the angular deviation causing a fifty per cent decrease in field strength from its maximum value.

In Fig. 1, the ground plates 4, 4' which serve to launch into space the electromagnetic energy leaving the guides through the slots 5 and 6 are curved concavely facing each other in order to increase the directivity of the radiation in a plane at right angles to the plane of the radiation guide. According to theory, the lines representing the electric vector of the radiation passing through the slot should meet the surface of ground plates 4 and 4' at right angles. The directivity of the radiation in the plane at right angles to the radiation guide is increased by causing the lines representing the electric vector to be only slightly curved where they leave the ground plates to be launched into space, and by making the distance between the outer free edges of the ground plates 4, 4' equal to a number of wavelengths of the energy radiated. The efficiency of the wave guide for obtaining greater directivity is thereby increased.

In Fig. 1 the excitation of the radiation guide by antenna 3 is such that corresponding points of guides 1 and 2, i. e., located at equal distances from the origin or apex of the guide, are excited in the same phase, resulting in a symmetrical radiation pattern.

In Fig. 4, antenna 13 is not symmetrically located with respect to wave guides 11 and 12, but is shown located in guide 11 at a distance from the origin or apex of the guide equal to one-eighth of a wavelength of the electromagnetic energy. Hence, the electromagnetic energy will reach the point in guide 12 corresponding to the antenna location in guide 11 after traveling a distance of one-quarter wavelength, resulting in a phase delay of $\pi/2$. Except for the small distance of a quarter wavelength at the origin, all points in wave guide 12 will experience a phase delay of $\pi/2$ relative to the corresponding points in wave guide 11.

The modification of the invention illustrated in Fig. 4 has been separately claimed in divisional application 458,127, filed September 12, 1942.

The electric field excitation at the guide of Fig. 4 is shown in Fig. 5, where the electric field, E, is plotted as ordinates against distances, $x$, along the guides as abscissae. A second plot shows the phase with which energy radiated from a point of the wave guide 11 or 12 at a distance $x$ from the apex of these guides, arrives at a far distant point located on the bisectrix of the angle between the guides. The phase difference between the energies radiated by any two points of the wave guides and received at this distant point is readily obtained by algebraically subtracting the ordinates of the curve whose abscissae represent these two points. In Fig. 5, the phase difference between the energies received at the distant point from corresponding points of the wave guides which are equi-distant from the apex is shown to be constant, and equal to $\pi/2$.

Fig. 6 is a graph similar to Fig. 3, illustrating the radiation pattern obtained at a distance point in the plane of the radiation guide of Fig. 4, when the field excitation at the guide is that shown in Fig. 5. It will be noted that the resulting radiation pattern is unsymmetrical, the field intensity for a given angular deviation decreasing much more rapidly for a deviation to the left than for an equal deviation to the right.

Fig. 7 illustrates a radiation guide designed to give an exciting field at the guide having the field distribution and phase angle relation shown in Fig. 10, which is similar to Fig. 5, giving a radiation pattern at a distance from the radiation guide substantially as indicated in Fig. 11, which is similar to Fig. 3.

In Fig. 7, the exciting antenna is located at the origin of the radiation guide, indicated as $a$. In wave guide 21, the portion from $a$ to $b$ is of reduced cross-section, while in wave guide 22, the corresponding portion from $a$ to $d$ is of increased cross-section, with respect to the normal cross-section for which, at the operating frequency and the same apex angle, all the elemental energies radiated from various points along the wave guide section $a$—$b$ or $a$—$d$ would arrive at the far distant reference point on the bisectrix in phase coincidence. Due to the reduced cross-section from $a$ to $b$, the phase velocity in guide 21 will be increased in this region resulting in a gain in phase of the energy reaching the distant point from this region of the guide relative to the phase of energy which would reach the distant point from a similarly disposed section of wave guide having normal cross section, while, due to the increased cross-section from $a$ to $d$, the phase velocity in guide 22 will be reduced resulting in a loss in phase, as indicated in Fig. 10. Guide 21 from $b$ to $c$ and guide 22 from $d$ to $e$ are of equal cross-section, the cross-section being intermediate between that from $a$ to $b$ and from $a$ to $d$. The direction in the plane of the radiation guide of Fig. 7 and containing the far distant reference point from which the phase angles plotted in Fig. 10 are measured is not the normal direction or bisectrix used in Fig. 5 for which the radiation from elements of guide 21 from $b$ to $c$ and from guide 22 from $d$ to $e$ would reach a distant point in phase. For convenience, a direction has been chosen for determining the origin of phase angles which makes a very slight angle with such normal direction, and for which the phase of the radiation arriving at the distant point from elements of guide 21 beginning at $b$ and ending at $c$ gradually drops behind in phase, as indicated in the graph $b$—$c$ in Fig. 10; while the phase of the radiation arriving at the distant point from the elements of guide 22 beginning at $d$ and ending at $e$ gradually advance in phase, as indicated in the graph $d$—$e$ in Fig. 10.

It will be noted from Fig. 11 that the radiation pattern obtained at a distant point corresponding to the field excitation at the radiation guide indicated in Fig. 10 is very desirable for certain uses, as for airplane landing purposes. The rate of decrease in signal strength with change in direction is very rapid to the left in Fig. 11, while to the right the rate of decrease is much more gradual. It will also be noted that there is no reversal of field, so that no ears or minor lobes of radiation will be present in the radiation pattern. With the radiation pattern indicated in Fig. 11, it is possible to greatly minimize, or substantially eliminate interference patterns due to ground reflection in blind landing systems, i. e., where the left hand portion of the pattern of Fig. 11 is towards the ground, while in a sky direction the beam of radiation can be readily located due to the gradual decrease in signal strength, as indicated to the right of Fig. 11.

Fig. 8 discloses an alternate means for obtaining the field excitation at the radiation guide indicated in Fig. 10, which results in the desirable radiation pattern at a distant point indicated in Fig. 11. For the sake of simplicity and clarity in illustration, launching plates are omitted from the showing of Fig. 8 in like manner as in Fig. 7.

In the radiation guide shown in Fig. 8, wave guides 31 from $a$ to $b$ and 32 from $a$ to $d$ have the same constant cross-section. From $b$ to $c$ the cross-section of guide 31 is increased resulting in a lowered velocity of wave propagation therein. From $d$ to $e$ the cross-section of guide 32 is decreased resulting in an increased velocity of wave propagation therein. The radiation guide is excited at the origin $a$ by antenna 33. The direction in the plane of the radiation guide of Fig. 8 selected as origin in Fig. 10, is so selected that, for a given distant point, the radiation arriving from successive elements from $b$ to $c$ of guide 31 gradually drop behind in phase, as indicated in the graph $b$—$c$ in Fig. 10; while the radiation arriving from successive elements from $d$ to $e$ of guide 32 will gradually advance in phase, as indicated in the graph $d$—$e$ in Fig. 10. The phase of the radiation arriving at the given distance point from intermediate elements $b$ to $d$ of the radiation guide will arrive in the phase relation indicated from $b$ to $d$ in the graph of Fig. 10.

Fig. 9 discloses yet another alternate means for obtaining the field excitation at the radiation guide indicated in Fig. 10, resulting in the desirable radiation pattern at a distant point indicated in Fig. 11.

In Fig. 9, the radiation guide is excited at the origin $a$ by antenna 43. Wave guides 41 and 42 are of constant cross-section throughout so that the rate of wave propagation within the guides remains constant. In order to obtain the field excitation at the radiation guide indicated in Fig. 10, the portion of guide 41 from $a$ to $b$ is so inclined with respect to the direction taken as origin in Fig. 11, that for a distant point in the place of the guide, the phase of the radiation arriving from successive elements from $a$ to $b$ will advance as indicated from $a$ to $b$ in graph of Fig. 10. With respect to the same distant point, the portion of wave guide 41 from $b$ to $c$ is so inclined that radiation arriving at the distant point from successive elements of guide 41 from $b$ to $c$ will drop back in phase, as indicated in the graph from $b$ to $c$ in Fig. 10. Similarly, for radiation reaching the distant point from elements of wave guide 42, the portion $a$ to $d$ is so inclined that the phase relation drops back from $a$ to $d$, while the portion $d$—$e$ of the wave guide is inclined to cause the phase relation to advance from $d$ to $e$, as shown in the graph of Fig. 10.

By defining the normal inclination of a straight portion of a wave guide radiating into space through openings in the wall of the guide, as being that inclination with respect to the axis of propagation of the radiation guide for which the radiation from elements along the guide portion all reach a distant point on the axis of the propagation in substantially the same phase, then the several forms of radiation guides shown in Figs. 7, 8, and 9 can be described in the same terms, as follows: The several portions of wave guides forming the radiation guide are so inclined with respect to the axis of propagation of the radiation guide that the radiation emanating from the various elements of length along the wave guides will reach a distant point on any selected axis of radiation with a predetermined phase relation, for instance, with the phase relation shown in the graph of Fig. 10. With such a definition, it will be noted that the effective inclination of a portion of a wave guide can be altered either by changing the direction of the wave guide portion, or by changing its cross-section to alter its rate of propagation.

Fig. 12 illustrates a radiation guide in which changes in inclination of wave guide portions take place gradually along the guide, instead of taking place abruptly at specified points along the guide. At the origin, a, wave guide 51 is of reduced cross-section so that the radiation will gain in phase, and the cross-section gradually increases toward the point b, and somewhat beyond, causing the gain in phase along guide 51 to gradually decrease until the phase is stationary in the region c. For wave guide 52, the cross-section at the origin a, is increased, but gradually decreases through the region d, so that the phase of the radiation drops behind from a to d and then remains constant in the region e, for which the cross-section of guide 52 is normal and has the same value as the cross-section of guide 51 in the region c. The phase relation of the field excitation at the radiation guide then corresponds to the graph of Fig. 13.

In the radiation guide of Fig. 12, the field strength excitation at the guide in the neighborhood of the origin a has been decreased by narrowing the radiation slots 55 and 56, so that less energy is radiated in the neighborhood of the origin a. This is indicated in the graph of the field strength E along the guide in Fig. 13. The slots are so modified as they transform the peak shown in Figs. 2 and 5, into the saddle shown in Fig. 13. The radiation pattern at a distant point in the plane of the radiation guide obtained from the field excitation at the guide shown in Fig. 13 is indicated in Fig. 14. This is a desirable radiation pattern for certain purposes.

It will be noted that in the embodiments of Figs. 4, 7, 8, 9 and 12, the electric fields at corresponding points equally spaced from the vertex or junction of the two arms of the wave guide antenna have a relative phase difference and are not in phase coincidence. In Fig. 4 this relative phase difference is produced by displacing the exciting or coupling means from the vertex. In Figs. 7, 8 and 12, this phase displacement is produced by producing differing phase velocities in at least a portion of the two arms of the wave guide antenna so that the travelling waves in the two arms produced by the common exciting means at the apex will have a relative phase difference. In Fig. 9, on the contrary, there is no relative phase difference in the wave guides between corresponding points, but an effect equivalent to such a phase difference is produced at a distant point by altering the inclination of the two guides along their length so that the distances which energies radiated from these corresponding points must travel to a distant point will be different, producing this phase difference.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for radiating electromagnetic energy comprising a hollow conducting tube, means for launching traveling electromagnetic waves therein, said tube having means distributed along its length for radiating electromagnetic energy, said radiating means being distributed along said tube for a distance that is long compared to a wave length of said waves in said tube, and adapted to radiate energy from points of said tube spaced closer than said wavelength, said tube being of varying contour along its length the contour of said tube predetermining the phase and the dimensions of said radiating means predetermining the amplitude of the electromagnetic radiation for producing an unsymmetrical beam of radiation.

2. Means for directing a beam of electromagnetic energy comprising, a plurality of wave guides making angles with each other, means for launching traveling electromagnetic waves of substantially linear polarization along said guides, and distributed means extending substantially at right angles to the electric vector of said waves along the length of said guides for extracting electromagnetic energy from said guides and radiating it into the space surrounding said guides, said guides being of variable configuration so as to produce an unsymmetrical radiation pattern in space due to the contributions to such pattern of the various portions of the guides adding up in a predetermined phase relationship.

3. Means for directionally radiating electromagnetic energy comprising, two wave guides forming a predetermined angle with respect to each other, said wave guides being of different configuration, said difference of configuration introducing a phase difference between the electromagnetic energy at corresponding points within said guides, said guides having distributed means for radiating electromagnetic energy into space in an unsymmetrical pattern.

4. Means for directionally radiating electromagnetic waves comprising a plurality of wave guides disposed at an angle of less than one hundred and eighty degrees to each other, means for launching traveling waves of substantially linear polarization along said guides, said guides having a pair of laterally spaced concave radiation launching plates extending longitudinally along the guides for narrowing the radiation pattern at right angles to the plane of said guides.

5. In apparatus of the character described for directionally radiating radio beams, a plurality of wave guides having common ends in electrical communication with each other, said guides having radiating means distributed continuously along their lengths for radiating electromagnetic energy, said radiating means being so proportioned that the energy radiated at different points along the guides is predetermined, and including opposed concave radiation launching plates extending therealong.

6. Means for directionally radiating electromagnetic waves comprising a pair of connected wave guides disposed at an angle with respect to each other, the opposed oppositely inclined sides of said guides bounding the angle therebetween having longitudinal slots extending along the length thereof, opposed concave radiation launching plates provided on said inclined sides of said guide at opposite sides of said slots, and means for setting up traveling waves within said guides to be launched through said slots and by said launching plates into space, said latter plates serving to increase the directivity of the radiation pattern in a plane at right angles to the plane of said guides.

7. In an apparatus of the character described, a conducting radiating guide, means for setting up traveling electromagnetic waves of substantially linear polarization within said guide, said guide having an electromagnetic radiating slot extending substantially at right angles to the electric vector of said waves and over an area of its surface having at least one dimension that is long compared to the wavelength of said electromagnetic wave in free space, said guide having a variable contour along its length, said contour predetermining the phase and the dimensions of said radiating means predetermining the amplitude of the electromagnetic radiation for producing an unsymmetrical radiation pattern.

8. Directive electromagnetic wave antenna apparatus comprising a plurality of wave guides making angles with each other and adapted to contain waves having substantially linear polarization travelling therealong, and including distributed means extending substantially at right angles to the electric vector of said waves along the length of said guides for electromagnetically coupling said guides to the space surrounding said guides, said guides being of variable configuration so as to produce an unsymmetrical directivity pattern in space due to the contributions to such pattern of the various portions of said guides adding up in a predetermined phase relationship.

9. Antenna means for creating an electromagnetic directivity pattern comprising two wave guides forming a predetermined angle with respect to each other and having distributed means for electromagnetically coupling said guides to surrounding space, said wave guides being of different configuration, whereby an unsymmetrical directivity pattern is produced.

10. Electromagnetic wave antenna apparatus, comprising a hollow conducting tube adapted to contain travelling electromagnetic waves therein, said tube having means distributed along its length for interchanging electromagnetic energy between the interior and exterior thereof, said interchanging means being distributed along said tube for a distance that is long compared to a wavelength of said waves in said tube, and also being adapted to interchange said energy at points of said tube spaced closer than said wavelength, said tube also being of varying configuration along its length to produce varying energy interchange along said length.

11. Apparatus as in claim 10, in which said conducting tube has a varying inclination along its length with respect to a fixed axis.

12. Apparatus according to claim 10, in which said conducting tube has varying cross-section along its length.

13. Apparatus according to claim 10, in which said distributed interchanging means comprises a slot formed in the wall of said tube and extending longitudinally therealong.

14. Apparatus according to claim 10 in which said distributed interchanging means comprises a slot formed in the wall of said tube extending longitudinally therealong and having variable width along said tube.

15. Electromagnetic wave antenna apparatus comprising a pair of hollow conducting wave guides disposed at an angle to one another, each having a slot distributed along its length for a distance long in comparison to a wavelength of waves of the operating frequency in said guides, one of said guides being of varying contour along its length for producing an asymmetrical directivity characteristic for said antenna apparatus.

16. Electromagnetic wave antenna apparatus comprising a pair of hollow conducting wave guides disposed at an angle to one another, each having a slot distributed along its length for a distance long in comparison to a wavelength of waves of the operating frequency in said guides, one of said guides being of varying cross-sectional dimensions along its length for producing an asymmetrical beam of radiation.

17. Electromagnetic wave antenna apparatus comprising a pair of hollow conducting wave guides disposed at an angle to one another, each having a slot distributed along its length for a distance long in comparison to a wavelength of waves of the operating frequency in said guides, said guides being of varying inclination along their lengths with respect to a fixed axis for producing an unsymmetrical beam of radiation.

18. Electromagnetic wave antenna apparatus comprising a pair of hollow conducting wave guides disposed at an angle to one another, each having a slot distributed along its length for a distance long in comparison to a wavelength of waves of the operating frequency in said guides, said slots being of varying width along the length of said guides to produce a desired distribution of electric field along said guides.

19. Electromagnetic wave antenna apparatus comprising a hollow conducting wave guide adapted to contain travelling electromagnetic waves of the operating frequency and having a slot extending along its length for a distance long in comparison to a wavelength in said guide of said waves, said slot being of varying width along its length to produce a desired distribution of electric field along said guide.

20. Wave guide antenna apparatus comprising a pair of wave guides having an interior and an exterior and disposed at an angle to one another and joined at a vertex, said wave guides having means providing differing phases of electromagnetic energy for points equally spaced from said apex when excited by an ultra high frequency operating frequency, whereby said antenna means will have an asymmetrical directivity characteristic, said wave guides having means distributed along the length thereof for exchanging said ultra high frequency energy between the interior and exterior of said guides.

21. Wave guide antenna apparatus comprising a pair of wave guides disposed at an angle to one another substantially less than 180° and joined at a vertex, said wave guides each having an interior and an exterior and also having means providing differing phases of electromagnetic energy for points equally spaced from said apex when excited by a wave of ultra high operating frequency, whereby said antenna apparatus will have an asymmetric directivity characteristic, said wave guides further having means distributed along the lengths thereof for exchanging said energy between the interior and exterior of said guides.

22. Electromagnetic wave antenna apparatus comprising a plurality of wave guides disposed at an angle of less than 180° to each other and having material boundaries capable of guiding waves and defining an interior and an exterior, means for coupling to travelling waves of substantially linear polarization within said guides, each of said guides having a pair of laterally spaced concave conductive plates extending longitudinally therealong for narrowing the directivity pattern at right angles to said each guide.

23. Electromagnetic wave antenna apparatus comprising a plurality of angularly disposed wave guides, said guides having material boundaries capable of guiding waves and defining an interior and exterior thereof and also having means distributed along their lengths for interchanging energy between the interiors and exteriors thereof, and including a pair of opposed concave conductive plates extending continuously therealong at opposite sides of said energy interchanging means.

24. Electromagnetic wave antenna apparatus comprising a pair of connected wave guides disposed at an angle with respect to each other, the opposed oppositely inclined sides of said guides bounding the angle therebetween having longitudinal slots extending along the length thereof, said guides having material boundaries defining interiors and exteriors thereof, opposed concave conducting plates provided on said inclined sides of said guides at opposite sides of said slots, and means for coupling to travelling waves within said guides, said latter plates serving to increase the directivity of the directivity pattern in a plane at right angles to the plane of said guide.

25. Electromagnetic wave antenna apparatus comprising a wave guide adapted to contain travelling electromagnetic waves and having a slot extending longitudinally in one wall thereof for a distance long in comparison to a wavelength of the operating frequency, and a pair of opposed concave conducting plates at opposite sides of said slot, said plates serving to increase the directivity of said antenna at right angles to said guide.

26. High frequency antenna apparatus comprising a pair of apertured hollow wave guides angularly disposed to form a V, and means for exciting said guides with respective high frequency waves having a relative phase difference, whereby an unsymmetrical directivity pattern is produced.

WILLIAM W. HANSEN.